Patented Jan. 12, 1932

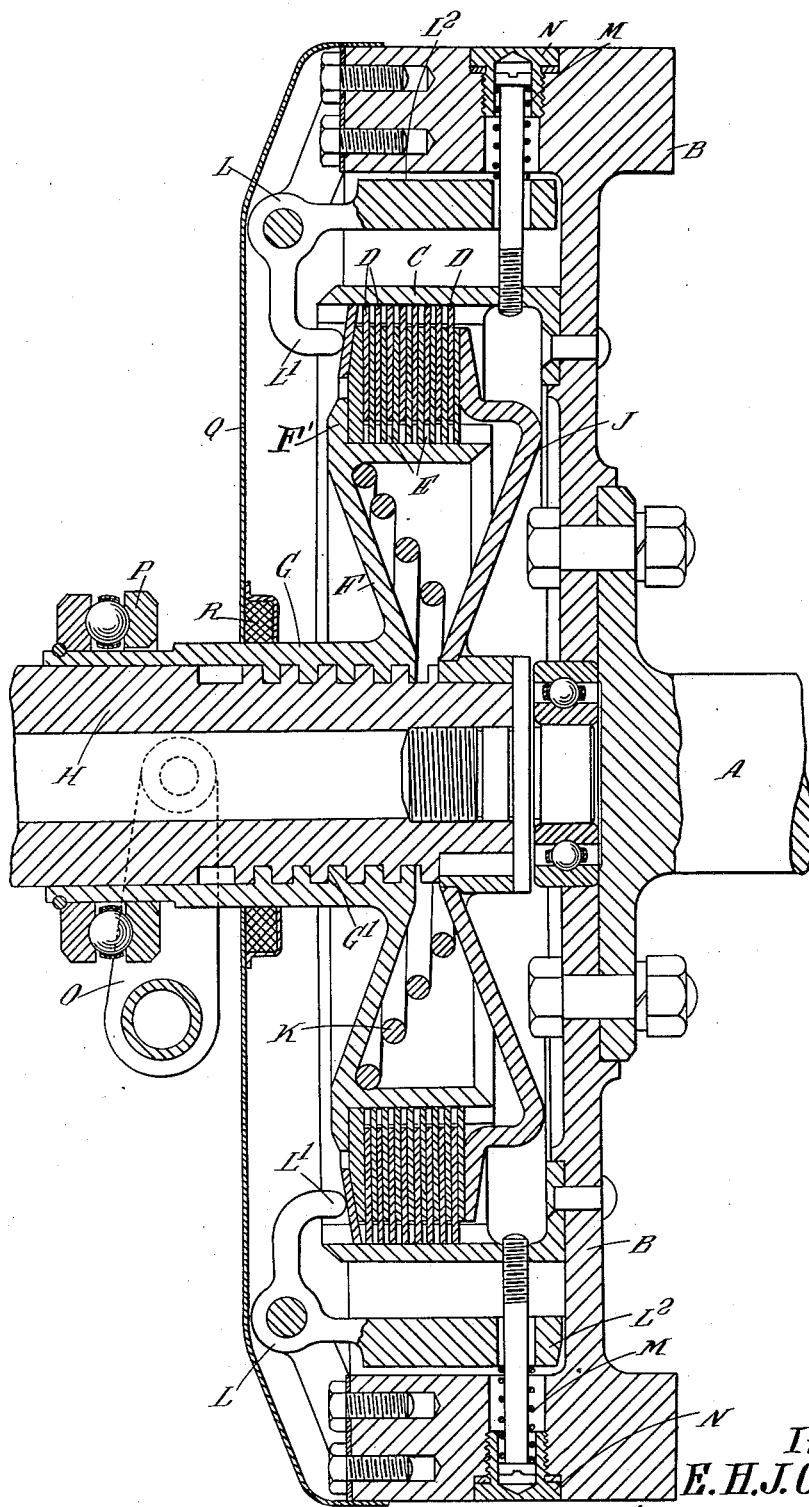

1,841,284

UNITED STATES PATENT OFFICE

EDWARD HENRY JAMES CECIL GILLETT, OF HAMPSTEAD, LONDON, ENGLAND

FRICTION CLUTCH

Application filed January 4, 1929, Serial No. 330,212, and in Great Britain January 31, 1928.

This invention relates to friction clutches for the transmission of power, and has for its primary object the provision of arrangements whereby engagement and disengagement of the clutch members are effected automatically and in accordance with the relative speeds of the driving and driven members.

The present invention primarily consists in a friction clutch having one clutch member mounted on a screw thread on the driven shaft and loaded by a spring acting to thrust the clutch members out of engagement, and centrifugal devices opposed to the thrust of the spring and operating at a predetermined rotational speed of the driving shaft to overcome the thrust of the disengaging spring and bring the clutch members into light frictional contact whereupon the screw thread operates to effect tight engagement which is maintained as long as the driving shaft is transmitting a torque to the driven shaft but is automatically released if the speed of the driving shaft tends to fall below that of the driven shaft. The pressure between the friction surfaces is thus always proportional to the torque of the driving member, so that the greater the torque to be transmitted, the more firmly are the clutch members engaged.

The invention is applicable to any of the well-known forms of friction clutch, such as the multiple plate, single plate, or cone types, and is especially useful in the transmission systems of motor road vehicles, since it provides an automatic disengagement and freewheel effect when the vehicle over-runs the engine, the clutch also remaining disengaged at all times when the engine is throttled down below a predetermined speed.

One constructional form of the present invention as applied to a multiple plate clutch suitable for a motor road vehicle is illustrated in the accompanying drawing which shows a central longitudinal section through the clutch.

Referring to the drawing:—

A driving shaft A which may be the crank shaft of an internal combustion engine has bolted thereto a fly wheel B which in turn carries a clutch member C on which is splined one set of plates D. The other set of plates E is splined on a member F having a flange F' abutting against the outer-most of the plates E, the said member being integral with a sleeve G mounted on the driven shaft H by means of a coarse pitch (preferably at 45°) square screw thread $G^1$. Interposed between the member F and a member J forming the fixed abutment for the clutch plates is a spring K tending to thrust the clutch members out of engagement.

Pivoted to rigid arms on the fly wheel B is a pair of centrifugal devices L in the form of bell-cranks located at 180° apart on the fly wheel. There may, of course, be a larger number of these devices if desired. One arm $L^1$ of each bell crank is provided with an inturned nose in contact with the outer plate and the other arm $L^2$ is weighted, and loaded counter-centrifugally by a spring M the pressure of which can be varied by turning a screwed head N passed through the periphery of the fly wheel.

A fork O co-operating with a thrust race P is provided to enable the clutch to be positively operated as by the usual foot pedal, if desired.

The operation is as follows, bearing in mind that the object of the invention is to provide that the clutch shall remain automatically disengaged below a predetermined speed of the driving shaft and also become disengaged when the driven shaft tends to exceed the speed of, or "over-runs", the driving shaft, whereas on accelerating the driving shaft beyond the predetermined speed the clutch is automatically engaged and kept engaged so long as the driving shaft is transmitting torque.

The pressure of the springs M on the weighted arms $L^2$ of the bell cranks is adjusted so that the spring load is overcome at the desired speed say 200 revolutions per minute. Below that speed therefore the arms $L^2$ are pressed inwards and the arms $L^1$ exert no pressure on the clutch plates. Upon the driving shaft A exceeding that speed, the arms $L^2$ under the influence of centrifugal force overcome the loading of the springs M and the arms $L^1$ force the clutch plates into light engagement which transmits rotary motion to the member F and sleeve G. The latter is thereupon screwed forward on the shaft H, increasing the contact pressure of the plates D and E which continues until there is no longer any slip between them.

During this time the sleeve G has been gradually imparting its rotation to the driven shaft H, and when there is no longer any slip between the plates D and E the shaft H is turning at the same speed as the shaft A. This clutch is intended to be run in oil and a cover Q furnished with a gland packing R is provided. Due to the presence of lubricant the take-up of torque is smooth and progressive while the oil is being forced from between the clutch plates, and jar or "snatch" is avoided.

On decelerating the driving shaft A, the load tending to maintain engagement is taken off the screw thread, and the sleeve G is thereupon screwed back on the shaft H bringing the clutch plates out of engagement, such disengagement being maintained by the spring K until the speed of the driving shaft H is again increased.

The advantages of employing a clutch of this kind in the transmission system of a motor vehicle will be readily appreciated. In the first place no clutch pedal or other operating member is necessary. The clutch engages automatically when the engine is accelerated above say 200 revolutions per minute, and disengages when the accelerator pedal is released, a "free wheel" effect being obtained.

What I claim is:

1. A friction clutch comprising driving and driven clutch members, the driven member having a central bore internally threaded, a driven shaft having an external thread engaging said bore, and the driven shaft and driven clutch member forming together a screw and nut of coarse pitch, spring means tending to hold the clutch members out of engagement, and a spring loaded centrifugal governor carried by the driving member and operating to thrust the clutch members into engagement as the speed of the driving member increases, whereby when the driving member exceeds a predetermined rate of rotation the said centrifugal governor brings the clutch members into light contact, thus causing the driven clutch members to turn and the coarse pitch screw elements then act to clamp the clutch members tightly together so long as the driving shaft continues to transmit a torque.

2. A friction clutch comprising a driving clutch member, a driven shaft having a coarse pitched external thread, a driven clutch member having a corresponding internal thread, friction elements for connecting the driven with the driving clutch member, spring means tending to disconnect said clutch members and a plurality of bell crank levers pivoted on the driving member, each lever having one limb weighted and the other limb adapted to press the frictional elements into light engagement when the weighted limb is subjected to sufficient centrifugal force, and adjustable spring means acting in opposition to such centrifugal force to prevent the engagement of the said frictional elements when the driving shaft is turning at less than a predetermined number of revolutions per minute, whereby when the driving member exceeds such predetermined number of revolutions per minute the centrifugal force will overcome the counter-centrifugal spring means and cause the bell crank levers to bring the frictional elements into light engagement, thus causing a differential turning movement of the coarse screw threads, and moving the driven clutch member axially so as to clamp the said frictional elements tightly together, so long as the driving member exerts a torque on the driven member.

EDWARD HENRY JAMES CECIL GILLETT.